United States Patent [19]

Sugiyama

[11] 3,781,787
[45] Dec. 25, 1973

[54] TIRE PRESSURE DETECTING APPARATUS

[76] Inventor: Uichiro Sugiyama, 21-10, Zenpukuji-1-chome, Suginami-ku, Tokyo, Japan

[22] Filed: June 13, 1972

[21] Appl. No.: 262,260

[30] Foreign Application Priority Data
June 17, 1971 Japan.................................. 46/43587

[52] U.S. Cl................................ 340/58, 200/61.25
[51] Int. Cl.......................................... B60c 23/02
[58] Field of Search.................... 340/58; 200/61.22, 200/61.25

[56] References Cited
UNITED STATES PATENTS
3,715,719  2/1973  Sugiyama............................. 340/58
2,057,556  10/1936  Cole..................................... 340/58

Primary Examiner—Alvin H. Waring
Attorney—John J. McGlew et al.

[57] ABSTRACT

The detecting apparatus includes a rotatable bar-type permanent magnet mechanically independent of, but operatively associated with, a magnet position sensing member such as a reed switch or a coil wound on a magnetic core. When the magnet has one predetermined position, the position sensing device gates a thyristor to trigger an alarm which may be an audio alarm, a visual alarm, or both. The magnet is secured to the outer end of a shaft mounted in a casing which, in turn, is mounted through a wheel rim, and the inner portion of the shaft has a latching configuration. An externally accessible flexible shaft may be manually pressed to swing the magnet to a position in which it does not operate the magnetic sensing device and, in this position, the latching means on the shaft is engaged by one end of a spring biased rod. The other end of the spring biased rod is associated with a diaphragm subjected to the pressure of the air within the tire and the wheel rim so that, when the air pressure drops, the spring biased rod is retracted to release the shaft. A spring then rotates the shaft to swing the magnet into a position in which it is operative on the reed switch or the winding wound on the magnetic core. The flexible shaft for setting the magnet to the latching position may be operated by air pressure responsive to inflation of the tire.

10 Claims, 13 Drawing Figures

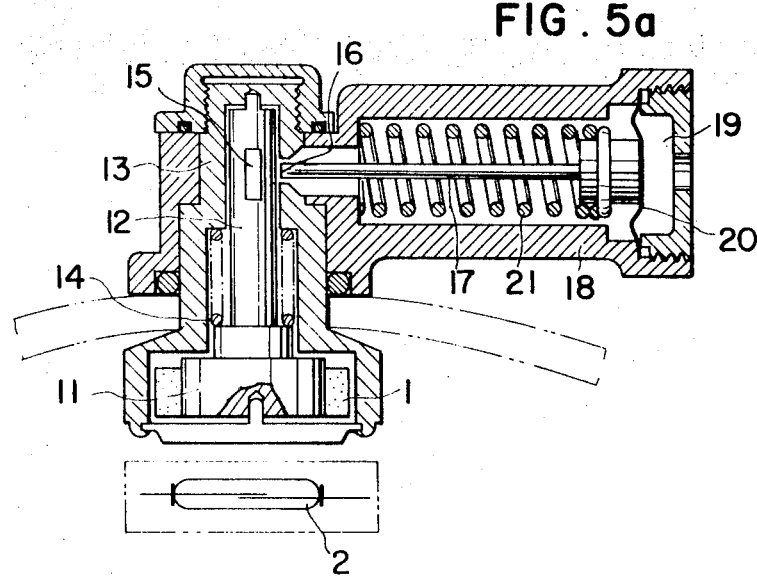

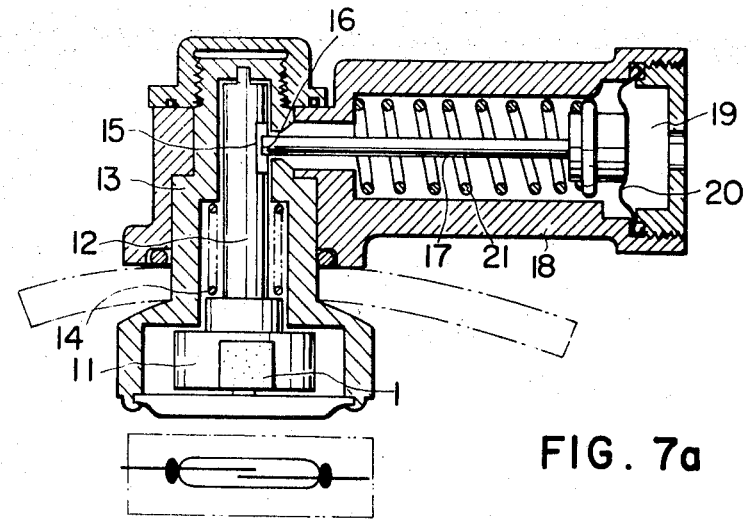
FIG. 7a
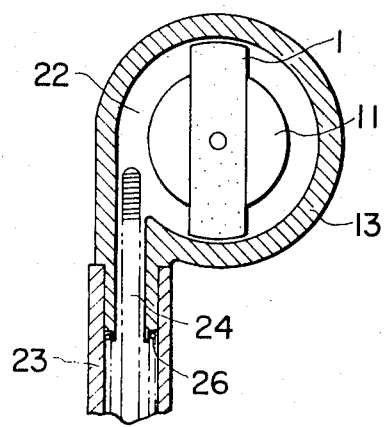
FIG. 7b
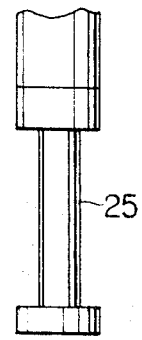

TIRE PRESSURE DETECTING APPARATUS

FIELD AND BACKGROUND OF THE INVENTION

This invention relates to improvements of a tire pressure detecting apparatus wherein a decrease in the air pressure in a vehicle tire arisen, arising from one cause or another, is detected, thereby to give an alarm. Various kinds of such apparatus have been proposed. All of these apparatuses actuate a detecting means by a linear displacement of the contact or separation between the side of a tire expanding or contracting by the variation of the air pressure in the tire, and a part where there is no such expansion or contraction. The detecting means for example, a wheel hub and actuate an alarm circuit including the detecting means. However, in this case there are the defects that, since the relative positions of each of such portions must strictly be adjusted, the mounting of the detecting apparatus is not only troublesome but also, in the tire of a vehicle running at a high speed, a detecting performance is remarkably lowered.

SUMMARY OF THE INVENTION

In this invention, there is provided an apparatus with which strict accuracy in mounting of the apparatus with respect to the tire and the wheel is not necessary. The apparatus includes a permanent bar magnet for actuating the detecting means through rotation of the magnet, and externally accessible means for resetting the permanent magnet after the latter has been actuated. The resetting means move the magnet to a position in which it is latched by pressure responsive means subjected to the pressure within the tire and, when the pressure within the tire decreases, the magnet is released to rotate, under the bias of a spring, to a position operating the detecting means.

Thus, the apparatus does not require the accurate mounting necessary with apparatus utilizing conventional linear displacement of the contact or separation between the side of a tire and the wheel hub. In addition, with the invention apparatus, a perfect response is possible even in a vehicle traveling at a high speed.

For an understanding of the principles of the invention, reference is made to the following description of typical embodiments thereof as illustrated in the accompanying drawings.

BRIEF DESCRIPTION OF THE DRAWINGS

In the drawings:

FIGS. 5a and 5b are sectional views showing the position of the parts following a pressure reduction in the tire;

FIGS. 7a and 7b are sectional views showing the position of the parts after resetting of the permanent magnet and before a pressure reduction in the tire;

FIG. 8 is an enlarged sectional view taken along the line VIII—VIII of FIG. 6a;

DESCRIPTION OF THE PREFERRED EMBODIMENTS

Figure 1:
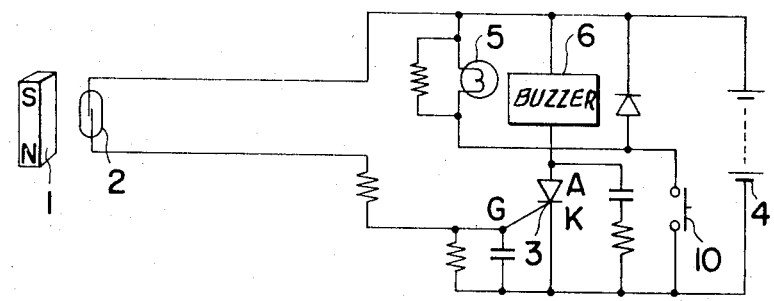
FIGS. 1 and 2 are schematic wiring diagrams of two different embodiments of the circuitry of the invention.
Figure 2:
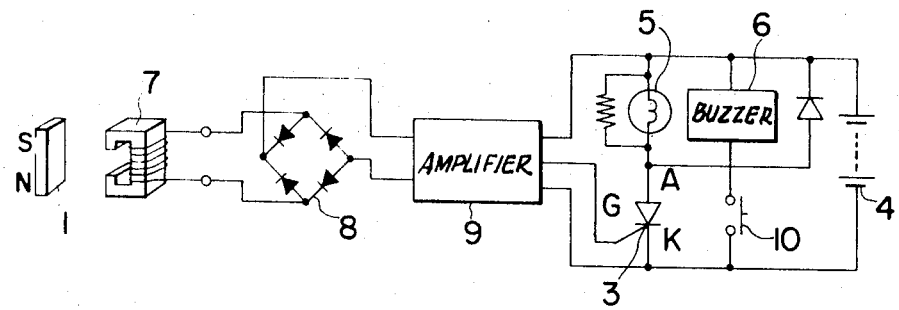

FIG. 1 shows an example of the circuit using a reed switch as a detecting means. FIG. 2 shows an example of the circuit using a detecting coil. When a magnet 1 of a pressure sensor in FIG. 1 becomes parallel to the reed switch 2 as illustrated, a gate voltage is applied to a thyristor 3 of an alarm unit whereby the current of a power source 4 flows to a lamp 5, a buzzer 6, etc to give an alarm. In FIG. 2, a detecting coil 7 is used instead of the reed switch of the pressure sensor, and a rectifier 8 and a low frequency amplifier 9 are provided in the circuit.

Since the relative polarities at opposite ends of detecting coil 7 vary in accordance with the winding direction of coil 7, the orientation thereof, or the relative polarity of bar magnet 1, the gate voltage of thyristor 3 is developed by rectifying and amplifying the voltage drop across detecting coil 7. Other than this, the circuit of FIG. 2 does not differ from that shown in FIG. 1. In both figures, reference numeral 10 indicates a reset switch and, in addition, a diode, resistors, condensers, etc. are used, primarily in order to protect thyristor 3. However, since these parts are not directly concerned with this invention, explanation thereof is omitted.

This invention relates also to resetting the magnet 1 of the pressure sensor for actuating the detecting means such as reed switch 2 or detecting coil 7.

Figure 6A:
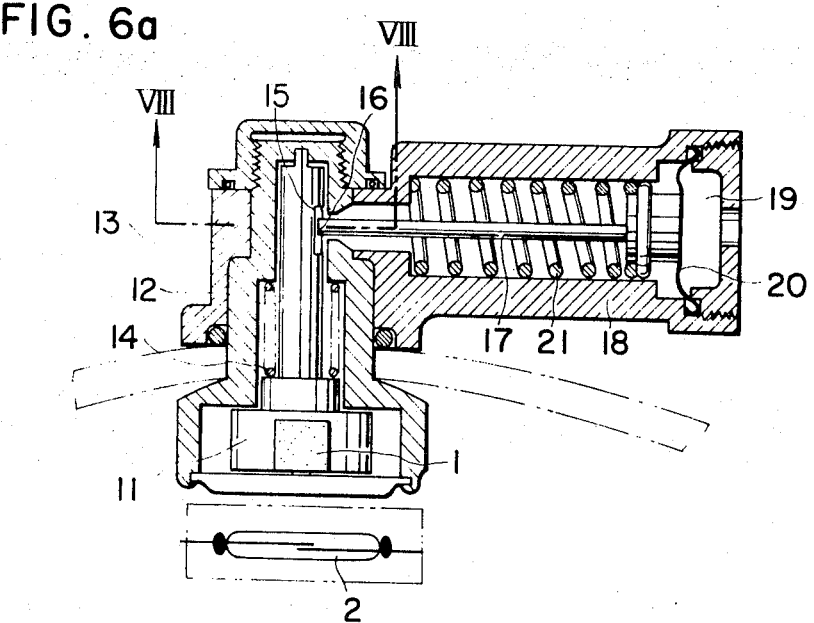
FIGS. 6a and 6b are sectional views showing the position of the parts during resetting of the permanent magnet.
Figure 6B:
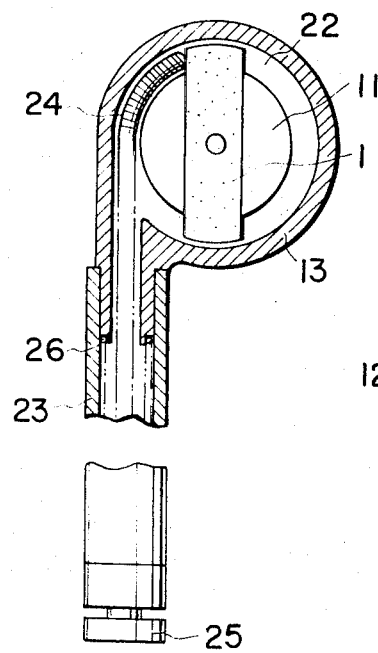
Figure 8:
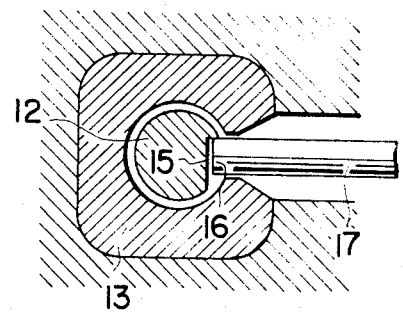

In FIGS. 5 to 8, FIGS. 5a, b show the state before resetting and at the time of pressure reduction of a tire, FIGS. 6a, b the state during resetting and FIGS. 7a, b the state with a suitable tire pressure after the completion of resetting. In FIGS. 5a, b reference numeral 11 indicates a rotor on which magnet 1 is mounted, numeral 12 a shaft integral with the rotor 11, and magnet 1, rotor 11 and shaft 12 are contained in a housing 13. A spring 14 surrounds shaft 12, and has one end secured to shaft 12 and the other end secured to housing 13, to return the magnet to the original position, whereby rotation of the shaft 12 is adapted to store a returning force in the spring 14. A notch 15 is provided at a part of the peripheral surface of said shaft 12. A working lever 17, having an inner end 16 engageable into the notch 15, is contained in a cylindrical case 18 mounted on the housing 13 in the direction approximately perpendicular to shaft 12 so as to enable it to reciprocate, and the rear or outer end of the working lever 17 is connected to a diaphragm 20 provided in a diaphragm chamber 19, or is in contact therewith. The bias of a spring 21 is always effective on lever 17 to urge lever 17 to the right, as viewed in the drawing, or toward the diaphragm 20.

A flexible shaft 24, consisting of a tightly wound spring, etc. is, movably inserted in a hollow passage 23 extending tangentially from an annular chamber 22 formed in the housing portion containing rotor 11 and magnet 1. The inner end of flexible shaft 24 is adapted to be brought into contact with magnet 1, and a push lever 25 is connected to the outer end of the flexible shaft 24. Further, there is provided a coil spring 26 for urging the lever 25 normally to an outward position.

The air pressure in a tire is adapted to act on the diaphragm 20 in chamber 19 on the side opposite to the working lever 17.

In the above construction, magnet 1 is arranged opposite to the detecting means (the reed switch 2 in this embodiment) of the pressure sensor so that the line joining poles S and N of the magnet 1 may be in parallel with the reed switch 2. When the magnet 1 is rotated by the driving means consisting of flexible shaft 24 and the push lever 25, shaft 12 is also rotated and, when it has been rotated through angle of about 90°, the and 16 of working lever 17 is engaged into to notch 15 and the shaft 12 is engaged with the notch 15 at that position with the returning force of the spring 14 stored therein. In this case, however, there is required the condition that the air pressure in tires naturally is acting on diaphragm 20 with a magnitude sufficient to push working lever 17 to the left as viewed in the drawing, namely, in the direction of said shaft 12. When the inner end 16 of the working lever 17 has engaged with the notch 15 as mentioned above, the lever 25 and the flexible shaft 24 are returned to the original position by releasing lever 25 of the driving or resetting means, but the magnet 1 remains at the reset position. Namely, the state is as shown in FIG. 7.

Figure 3:
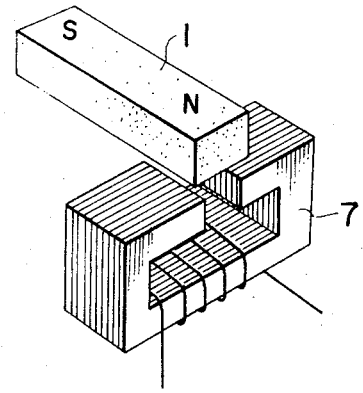
FIGS. 3 and 4 are perspective views illustrating two different positional relationships between a detecting coil and a permanent bar magnet.
Figure 4:
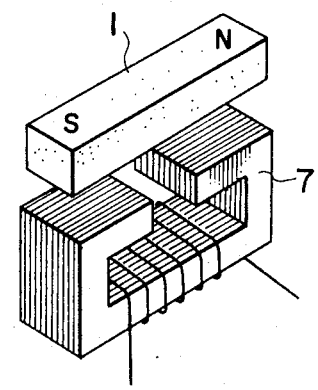

While the apparatus is in the state shown in FIG. 7, if the pressure in the tire is lowered, the diaphragm 20 is displaced to the right by the force of the spring 21 and, as a result, the inner end 16 of the working lever 17 is released from the notch 15. Therefore, the shaft 12 is reversely rotated toward the original position by the force stored in the spring 14 for the return to the original position, whereby the magnet 1 is positioned parallel with the reed switch 2. Accordingly, this switch 2 is actuated to activate the alarm unit. Also, in case the detecting coil 7 is used as the detecting means, no magnetic flux flows between the opposite poles of the armature on which coil 7 is wound when magnet 1 occupies a position shown in FIG. 3. Consequently, there is no flow of current to the alarm unit. When magnet 1 is restored to the original position as shown in FIG. 4, the alarm unit is energized.

Figure 9:
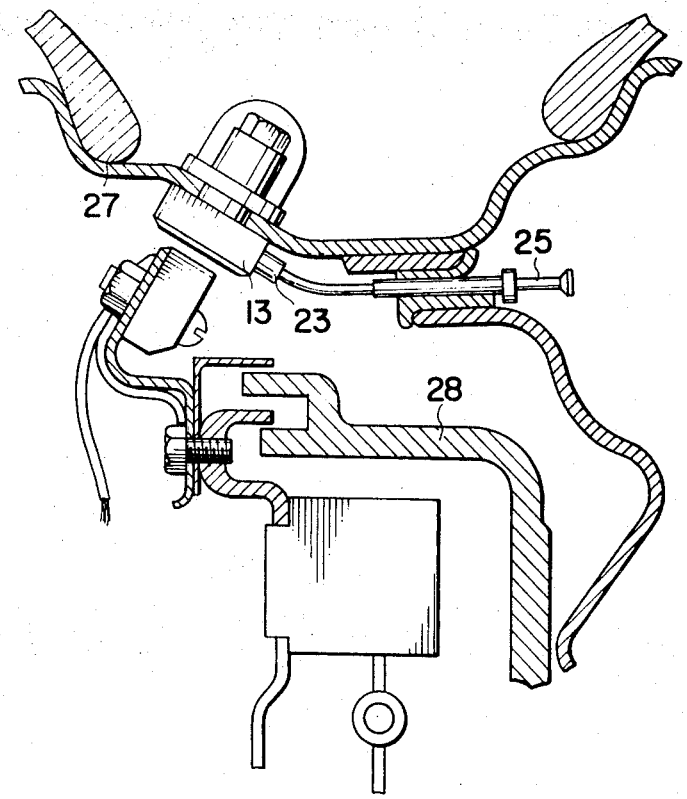
FIG. 9 is a sectional view illustrating the detecting apparatus as mounted on a wheel rim and associated parts.

The magnet 1 of the pressure sensor and the detecting means are provided between a tire 27 and a wheel hub 28, for example, as shown in FIG. 9.

Figure 10:
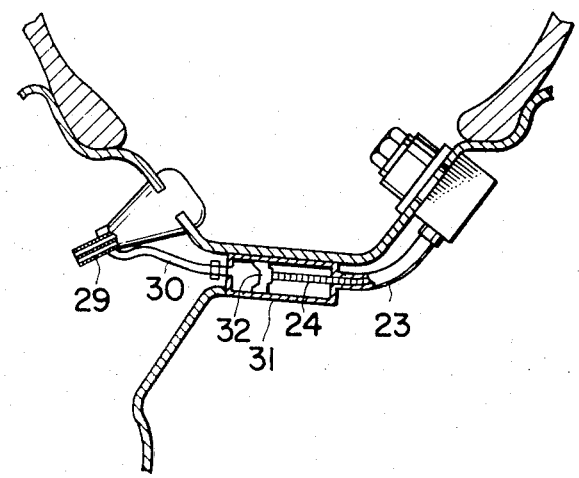
FIG. 10 is a view, similar to FIG. 9, illustrating a modification of the detecting apparatus.

In the above-mentioned case, resetting is effected by the manual operation of the push lever 25 but, in the embodiment shown in FIG. 10, a branch pipe 30 has one end communicating with the tire valve 29 so as to be subjected to air under pressure when the tire is inflated through valve 29. The other end of branch pipe 30 communicates with a cylinder 31 which in turn communicates with the hollow passage or conduit 23 serving as a guide for flexible shaft 24. The outer end of shaft 24 is connected to a piston 32 reciprocable in airtight relation in cylinder 23.

Except when the tire is being inflated through valve 29, piston 32 is moved to the left to the position shown in FIG. 10 by the atmospheric pressure acting on the right side of the piston. Consequently, flexible shaft 24 is retracted and has a position corresponding to the position shown in FIGS. 5b and 7b. However, when the tire is inflated through valve 29, the high pressure air acts on piston 32 through branch pipe 30 to move piston 32 to the left, thus projecting flexible shaft 24 to reset magnet 1 automatically.

While specific embodiments of the invention have been shown and described in detail to illustrate the application of the principles of the invention, it will be understood that the invention may be embodied otherwise without departing from such principles.

What we claim is:

1. Tire pressure detecting apparatus comprising, in combination, a housing arranged for mounting in a tire and wheel rim assembly with its inner end positioned in the interior of the assembly and its outer end positioned externally of the assembly; a shaft rotatably mounted in said housing and having a latch portion adjacent its inner end; a permanent bar magnet secured to said shaft adjacent the outer end of said housing to extend diametrically of said shaft; a magnetically actuated detecting means, forming part of an alarm unit, positioned adjacent the outer end of said housing and mechanically separate therefrom, said detecting means having a preset orientation such that it is magnetically activated by said bar magnet when said bar magnet has an alarm operating position; spring means operatively engaged between said housing and said shaft and biasing said magnet to its operating position; a resetting means extending into said housing and operable to engage said magnet and rotate it from its operating position to a reset in which said magnet is ineffective to activate said detecting means; and tire air pressure responsive means mounted on the inner end of said housing and including latch means engageable with said shaft latch portion when said magnet is rotated to its reset position; said latch means disengaging said latch portion responsive to a decrease in tire air pressure, for spring biased rotation of said magnet to its operating position.

2. Tire pressure detecting apparatus, as claimed in claim 1, including means biasing said resetting means to a position in which said resetting means is disengaged from said magnet.

3. Tire pressure detecting apparatus, as claimed in claim 1, in which said resetting means includes an externally accessible manually operated operating member.

4. Tire pressure detecting apparatus, as claimed in claim 1, including inflation air operable means connected to the tire valve and to said resetting means; said inflation air operated means actuating said resetting means to rotate said magnet to its reset position responsive to inflation of the tire.

5. Tire pressure detecting apparatus, as claimed in claim 1, in which said detecting means is a reed switch.

6. Tire pressure detecting apparatus, as claimed in claim 1, in which said detecting means is a coil wound on an armature having an air gap.

7. Tire pressure detecting apparatus, as claimed in claim 1, in which said tire air pressure responsive means comprises a cylindrical casing secured to the inner end of said housing and opening into the latter; said latch means comprising an operating lever reciprocable in said casing and having an inner end engageable with said shaft latch portion; a diaphragm closing the outer end of said casing and subjected, on one side, to the tire air pressure; and spring means biasing said lever to engage said diaphragm and to a position disengaging its inner end from said shaft latch portion.

8. Tire pressure detecting apparatus, as claimed in claim 1, in which the outer end of said housing defines a cylindrical chamber in which said permanent bar magnet is rotatable; said resetting means comprising a flexible shaft extending tangentially into said chamber to engage said bar magnet; and means biasing said flexible shaft to a retracted position in which its inner end is disengaged from said bar magnet.

9. Tire pressure detecting apparatus, as claimed in claim 8, including a manual operating handle on the outer end of said flexible shaft.

10. Tire pressure detecting apparatus, as claimed in claim 8, including a cylinder having one end connected to and communicating with the tire inflating valve; said flexible shaft extending into the opposite end of said cylinder; and a piston secured to said flexible shaft and reciprocable in said cylinder; whereby, upon inflation of the tire, said piston is moved in a direction to project said flexible shaft to engage said bar magnet to rotate said bar magnet to its reset position.

* * * * *